United States Patent [19]

Dyckman

[11] Patent Number: 5,748,667
[45] Date of Patent: May 5, 1998

[54] SPREAD SPECTRUM MODULATION USING TIME VARYING LINEAR FILTERING

[76] Inventor: Howard L. Dyckman, 365 Newton Rd., #C5, Warminster, Pa. 18974-5332

[21] Appl. No.: 621,400

[22] Filed: Mar. 25, 1996

[51] Int. Cl.⁶ .................................................. H04K 1/00
[52] U.S. Cl. .................................................. 375/200
[58] Field of Search .................... 375/200, 201, 375/202, 203, 206, 350; 364/724.01; 381/51

[56] References Cited

U.S. PATENT DOCUMENTS 5,005,204  4/1991  Deaett .................................. 381/51
5,012,490  4/1991  Myer ................................... 375/350

OTHER PUBLICATIONS

A Novel Approach to Spread Spectrum Communication Using Periodic Time Varying Filters. Duverdier et al. May 1995 .Information Theory and Applications II. 4th Canadian Workshop. pp. 64–75.

*Primary Examiner*—T. Ghebretinsae
*Attorney, Agent, or Firm*—Harvey Fendelman; Peter A. Lipovsky; Michael A. Kagan

[57] ABSTRACT

A method for transmitting information by radio over a wide bandwidth comprises the steps of: inputting a data signal into a time varying filter modulator; spreading the data signal in time and in frequency to produce a wideband signal; modulating the wideband signal onto an RF carrier to provide an RF output signal; and transmitting the RF output signal. The step of spreading includes performing a series of linear transformations to the data signal.

2 Claims, 13 Drawing Sheets

SPREAD SPECTRUM MODULATION USING TIME VARYING LINEAR FILTERING

BACKGROUND OF THE INVENTION

The present invention relates to spread spectrum modulation of radio frequency signals, and more particularly, to spread spectrum modulation using time varying filtering.

Time varying linear filtering is a very general technique which can generate a broad class of spread spectrum signals. As a spread spectrum technique, it admits a broader class of waveforms than are commonly used today, which may give rise to performance benefits in several areas of application, including Anti-jam communications, Low Probability of Intercept communications, and Code Division Multiple Access communications. Spread spectrum RF modulation is a technique for radio communications which involves generating radio frequency waveforms which cover a broad frequency band in the RF spectrum. Spread spectrum modulation of a radio signal makes the transmission of such signals harder to jam, and also allows many transmissions to be sent within the same band, where they overlap in frequency, but are distinguished by different spreading codes.

Direct sequence spread spectrum modulation involves multiplying a data signal by a pseudorandom binary-valued or multi-phase-valued time function. The result is modulated on the RF carrier by multiplying the signal by the carrier waveform. Frequency hopped spread spectrum involves jumping the carrier frequency around in a pseudorandom way. These are the two principal methods of spread spectrum modulation, which are special cases of time varying filtering. Both these methods provide resistance to jamming. Both provide a way for many transmissions to occupy the same band in a way other than assigning a specific narrow frequency allocation to each transmission.

Time varying filtering is applicable to other signal processing tasks unrelated to spread spectrum modulation. In order for the waveform produced by a time varying filter to be suitable for spread spectrum modulation, the impulse response of the time varying filter (hereinafter "TVF") must vary at a rate orders of magnitude greater that the input signal bandwidth. Let $h(s, t')$ represent the time-varying impulse response of the TVF, where $t'$ is the input time variable and $s=t-t'$ is the difference time variable, where $t$ is the output time variable. The variation of the TVF must be rapid in two respects: First, at two closely spaced values of the input time variable, $t'=t_1'$ and $t'=t_2'$, respectively, the TVF's instantaneous impulse responses, $h(s, t_1')$ and $h(s, t_2')$ respectively, should be quite different for as least some values of the difference time variable, s. Second, each impulse response $h(s,t')$, should be a rapidly fluctuating function of the difference time variable s.

Both forms of rapid variation are necessary (although not sufficient); without either one, the rapid variation introduced by the other will be smeared out and little if any spreading will be effected.

A need exists for better forms of covert radio transmission that an adversary would find difficult to intercept; transmissions having this property are called Low Probability of Intercept (LPI) transmissions. Mathematical analysis has shown that jointly gaussian random processes can make good LPI waveforms. Time-varying filters can generate waveforms which appear like jointly gaussian processes because of two factors: the potential of the filters' impulse responses to assume values from a continuum, and the capability of the filters to have very long impulse responses so that the effects of many data samples overlap in time.

A need exists for better protection of radio transmissions from noise and jamming. The direct sequence and frequency hopped spread spectrum methods spread the data in frequency but not in time, and therefore can provide significant protection from a jammer that concentrates its power at specific frequencies, but not from a pulsed jammer (i.e., a jammer that concentrates its power within specific time intervals). For this reason, error-correcting coding and interleaving are often used as supplementary protection against a pulsed jammer. To increase the protection, several error-correcting codes may be layered, but this introduces inefficiency and increases the complexity of decoding. Chips may be interleaved to improve resistance to a pulsed jammer, but this makes the design of an LPI waveform difficult.

A need exists for radio transmissions that are limited to specific bands. Most radio transmissions exhibit a gradual decay in strength at the edge of the frequency band. One may employ aggressive filtering to produce a sharp cutoff at the edge of the band, but this introduces distortions which impair reception because the receiver is not matched to the altered waveforms.

A need exists to shape the spectrum of radio transmissions to conform to certain requirements, such as to avoid certain frequency bands. TVF spread spectrum provides more degrees of freedom than other methods to shape the spectrum of transmissions.

A further need exist for better multiple access spread spectrum systems to accommodate more users.

SUMMARY OF THE INVENTION

A method for transmitting information by radio over a wide bandwidth comprises the steps of: inputting a data signal into a time varying filter modulator; spreading the data signal in time and in frequency to produce a wideband signal; modulating the wideband signal onto an RF carrier to provide an RF output signal; and transmitting the RF output signal. The step of spreading includes performing a series of linear transformations to the data signal.

An advantage of the present invention is that it employs TVF spread spectrum techniques, using data spread in time as well as in frequency, to provide a built-in level of resistance to pulsed jamming, reducing the need for additional protection.

Another advantage of the invention is that it enables TVF transmissions having a sharp cutoff at the edge of the frequency band.

These and other advantages of the invention will become more apparent upon review of the Specification, claims, and drawings.

Throughout the several views, like components are referenced with like references.

DESCRIPTION OF THE PREFERRED EMBODIMENT

Figure 1:
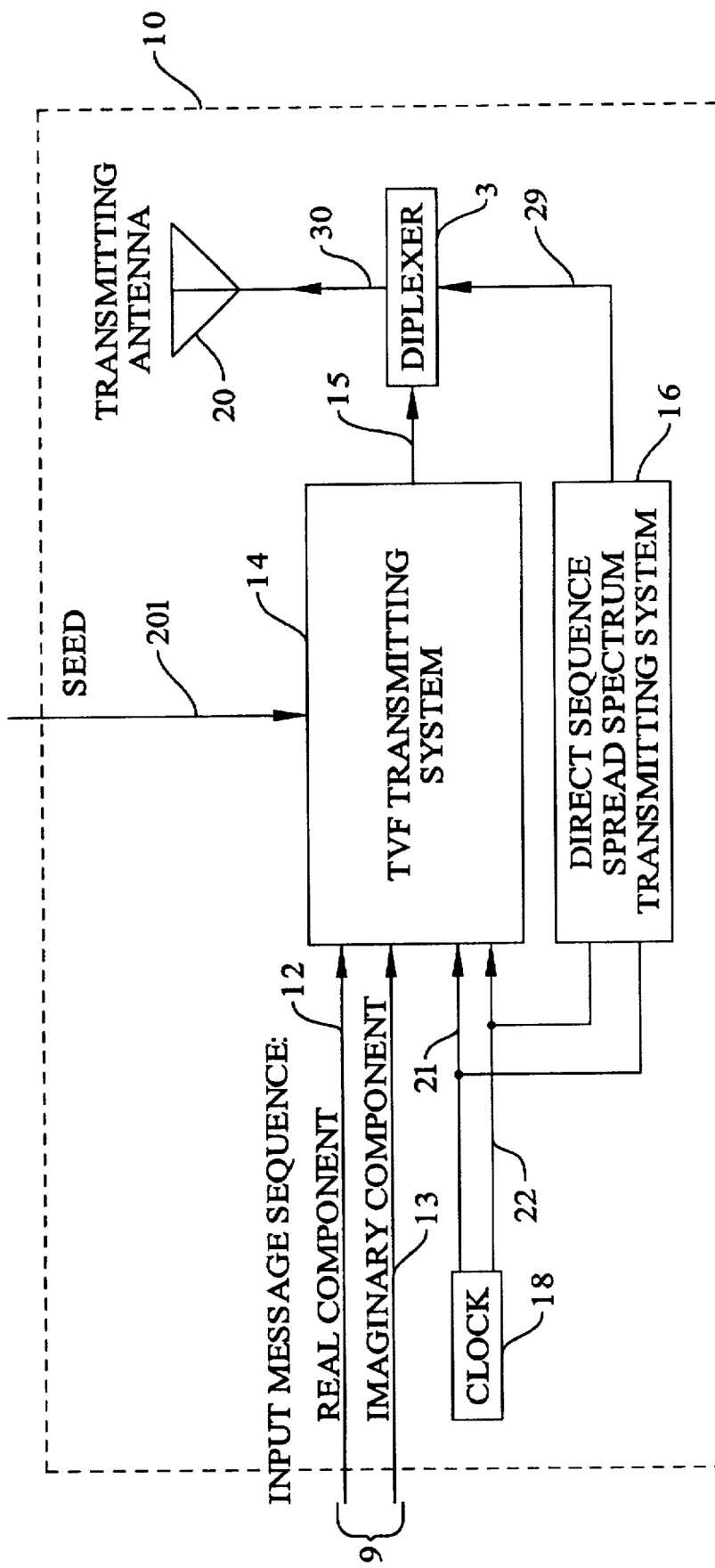
FIG. 1 is a block diagram of a spread spectrum transmitting system embodying various features of the present invention.
Figure 4:
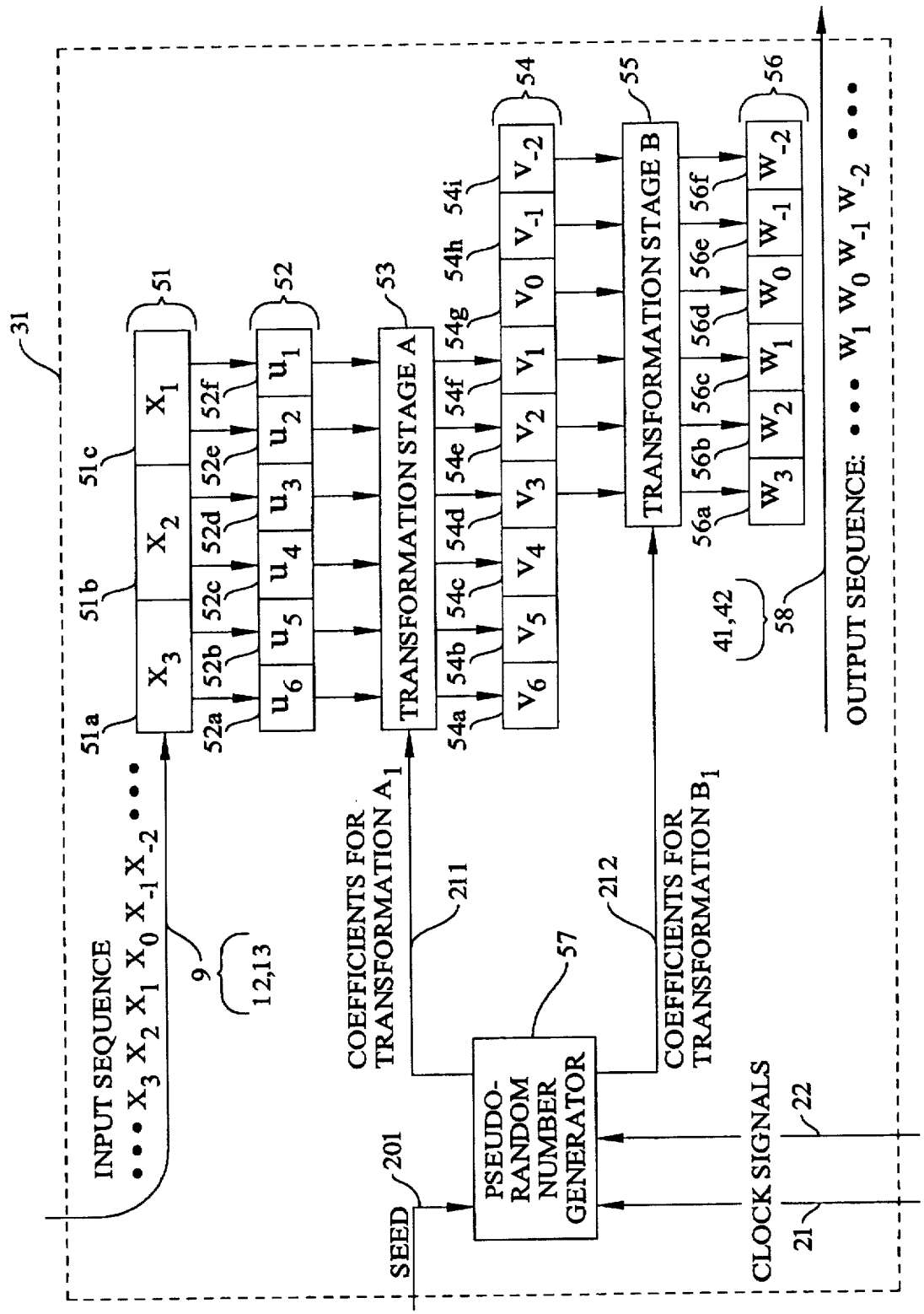
FIGS. 4 and 5 illustrate the operation of the digital TVF modulator of FIG. 3.
Figure 7:
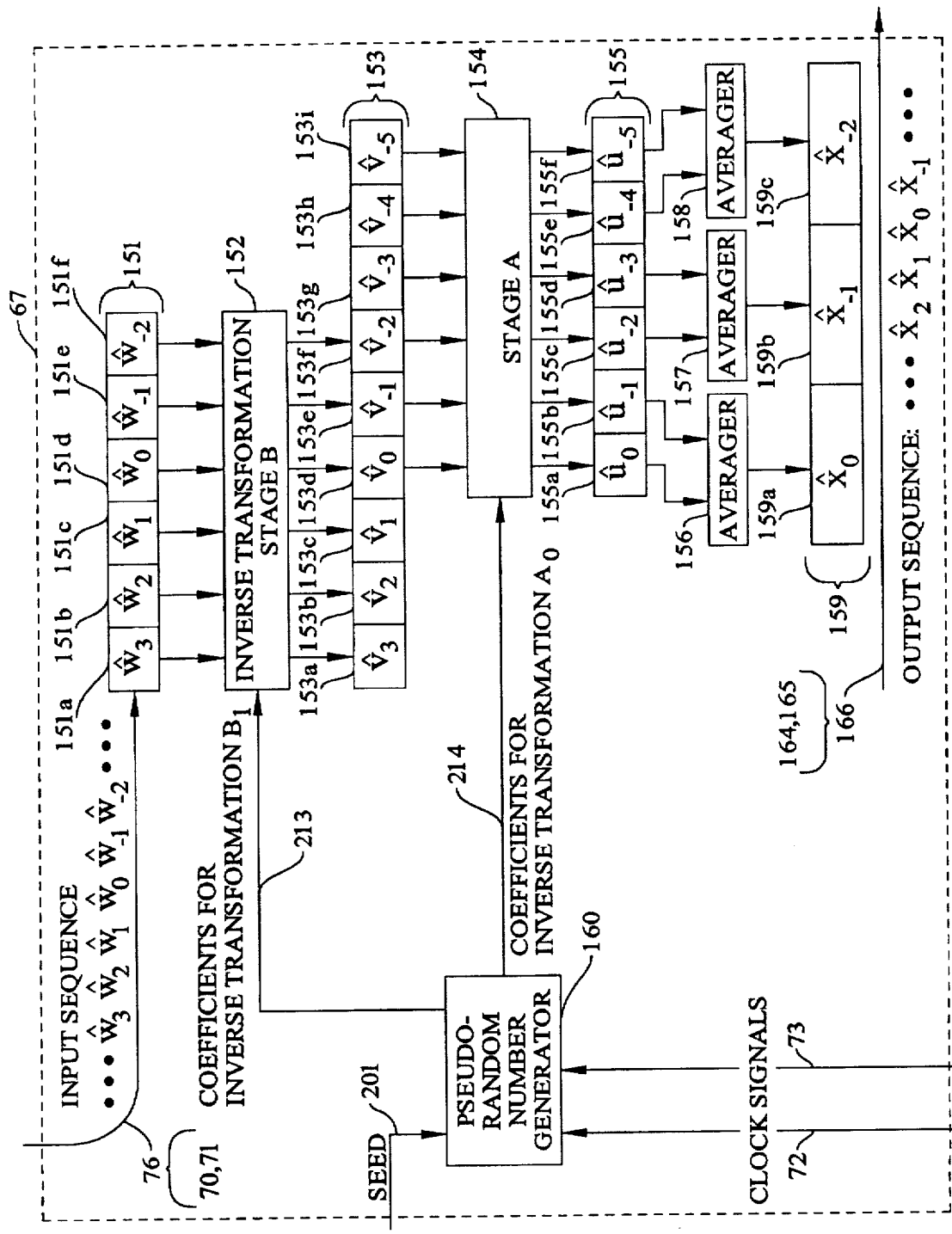
FIGS. 7 and 8 illustrate the operation of the digital TVF demodulator of FIG. 6.

Referring to FIG. 1, there is an overview of a spread spectrum transmitting system 10. Input signal 9 is a message signal that is to be sent and comprises a real part 12 and an imaginary part 13. The parts 12 and 13 are provided to a time varying filter (TVF) transmitting system 14, and are generally in the form of binary data (for example, +1, −1 values only) or analog samples. In the case where the input signal 9 is a sequence of analog samples, it may have been produced by the sampler 4 shown in FIG. 10 from a continuous-time analog sequence 5 comprised of real part 6 and imaginary part 7. The analog samples 9 may be real or complex. If real, the value of part 13 is zero. A seed 201 to be used for initializing the pseudorandom number generators 57 and 160 (which are shown in FIGS. 4 and 7 and discussed further herein) is entered into TVF transmitting system 14, and into spread spectrum receiving system 11 shown in FIG. 2. The purpose of seed 201 is to provide the same initialization for each pseudorandom number generator 57 and 160.

Referring to FIG. 1, a clock 18 generates two signals 21 and 22 which are provided to TVF transmitting system 14. Clock signal 21 comprises a sequence of pulses used to trigger internal operations of the blocks comprising the system. Clock signal 22 provides a precise numerical indication of the time incremented at least once for each pulse. The output of TVF transmitting system 14 is a radio frequency (RF) signal 15 which is fed to transmitting antenna 20 via diplexer 30 and transmitted as radio waves.

Still referring to FIG. 1, a conventional direct sequence spread spectrum transmitting system 16 enables the receiving system 11 to acquire synchronization of timing and RF frequency. The clock signals 21 and 22 are fed into the direct sequence spread spectrum transmitting system 16 to direct it to produce a spread spectrum waveform 29 that is synchronized with 15. The RF waveforms 15 and 29 are combined by diplexer 3 to form RF signal 30. RF signal 30 transmitted by antenna 20 as radio waves, in order to communicate message sequence 9 to spread spectrum receiving system 11.

Figure 10:
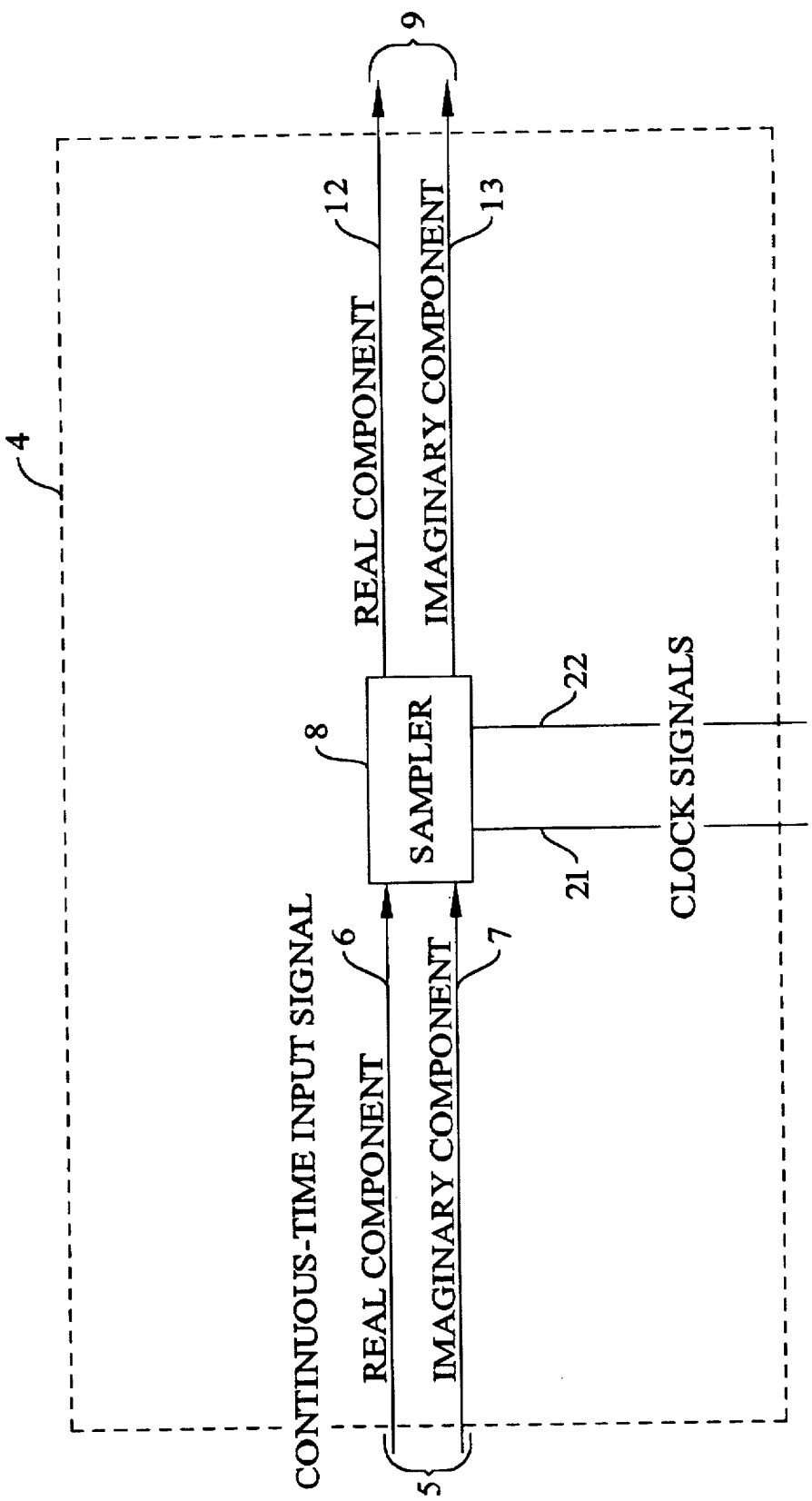
FIG. 10 illustrates a sampler which converts a continuous-time complex valued analog signal to a sequence of complex samples.

Referring to FIG. 10, there is shown a sampler 4 which converts a continuous-time complex valued analog message signal 5 to a sequence of complex samples 9. Signal 5 is composed of real part 6 and imaginary part 7. Sequence 9 is composed of real part 12 and imaginary part 13. The sampler 8 produces samples of 6 and 7 at a uniform rate in synchronism with the pulses of clock signal 21 but at a submultiple of the rate of the pulses of clock signal 21. The sampling rate is preferably at least as fast as the Nyquist rate, determined by the frequency content of the complex signal 5, to enable the signal 5 to reconstructed from the samples 9 without loss of quality. Clock signal 22 provides the time and is used by 8 to determine when to sample 6 and 7. The samples are output as 12 and 13. The analog signal 5 may be real or complex. If real, the value of part 7 is zero and the value of part 13 is zero.

Figure 2:
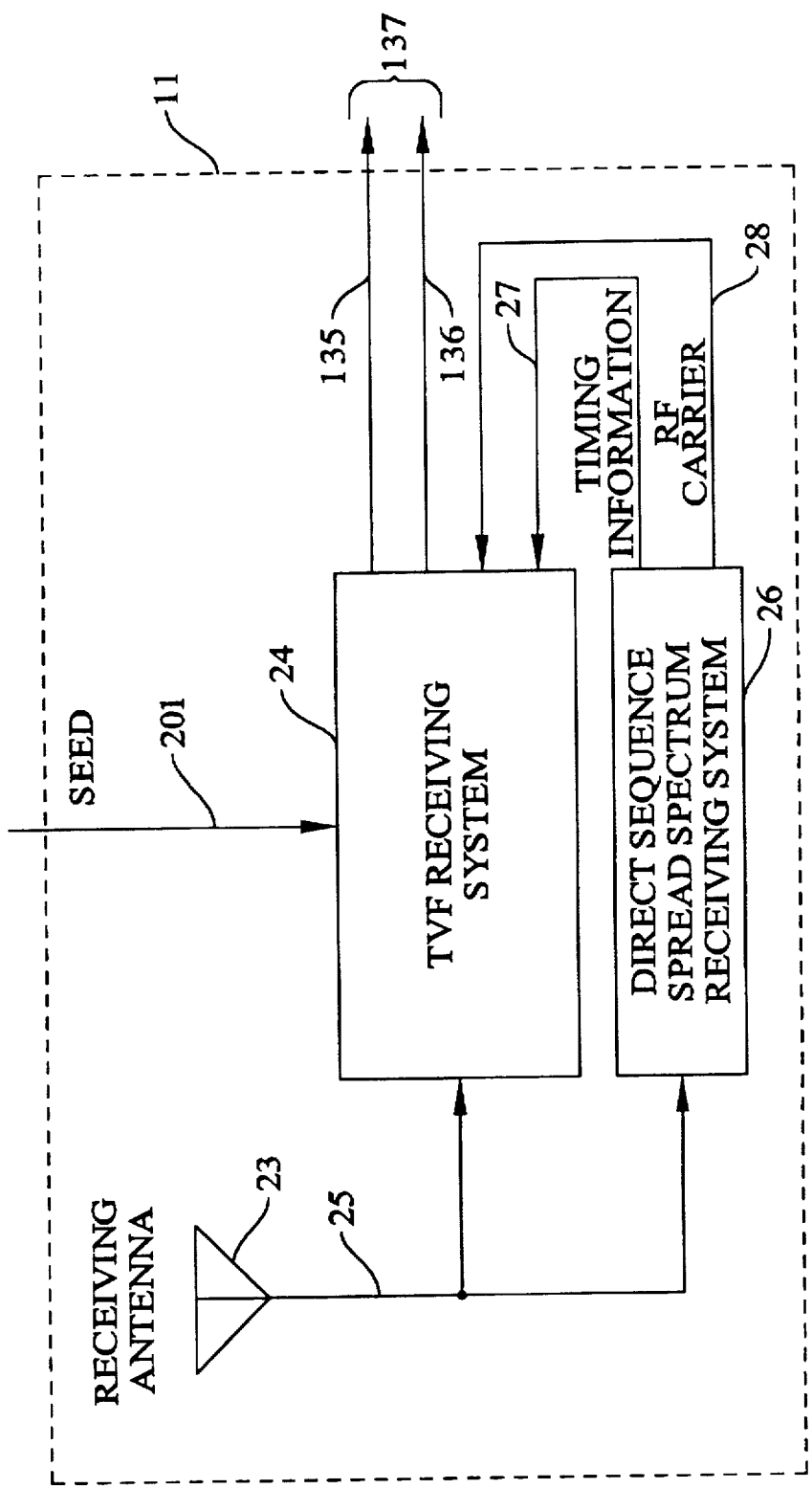
FIG. 2 is a block diagram of a spread spectrum receiving system embodying various features of the present invention.

Referring to FIG. 2, there is shown a spread spectrum receiving system 11 comprising an antenna 23, a TVF receiving system 24, and an auxiliary direct sequence spread spectrum receiving system 26. The purpose of spread spectrum receiving system 11 is to produce a replica 137 of input message sequence 9. The sequence of samples 137 is output by the spread spectrum receiving system 11 as the receiver output. The real part 135 of replica 137 is a replica of the real part 12 of input message sequence 9, and the imaginary part 136 of replica 137 is a replica of the imaginary part 13 of input message sequence 9. A radio frequency signal 25 gathered by antenna 23 is provided as an input to the TVF receiving system 24 and also to the conventional direct sequence spread spectrum receiving system 26. System 26 acquires synchronization to the timing and RF frequency of the portion of radio signal 25 generated by the direct sequence spread spectrum transmitting system 16. System 26 also sends timing information signals 27 and a RF carrier 28 to the TVF receiving system 24 to enable the TVF receiving system 24 to acquire synchronization of the timing and RF frequency of the portion of the radio signal 25 generated by TVF transmitting system 14. Once the TVF receiving system 24 has been synchronized, the transmitting system 16 and receiving system 26 can be turned off. If the TVF receiving system 24 loses synchronization, the direct sequence spread spectrum transmitting system 16 and direct sequence spread spectrum receiving system 26 may preferably be reactivated and used to enable the TVF receiving system 24 to reacquire synchronization.

The TVF transmitting system 14 is described in detail with reference to FIG. 3. It should be noted that the TVF transmitting system 14 is well known by those skilled in the art, except for the digital TVF modulator 31, described further herein.

Figure 3:
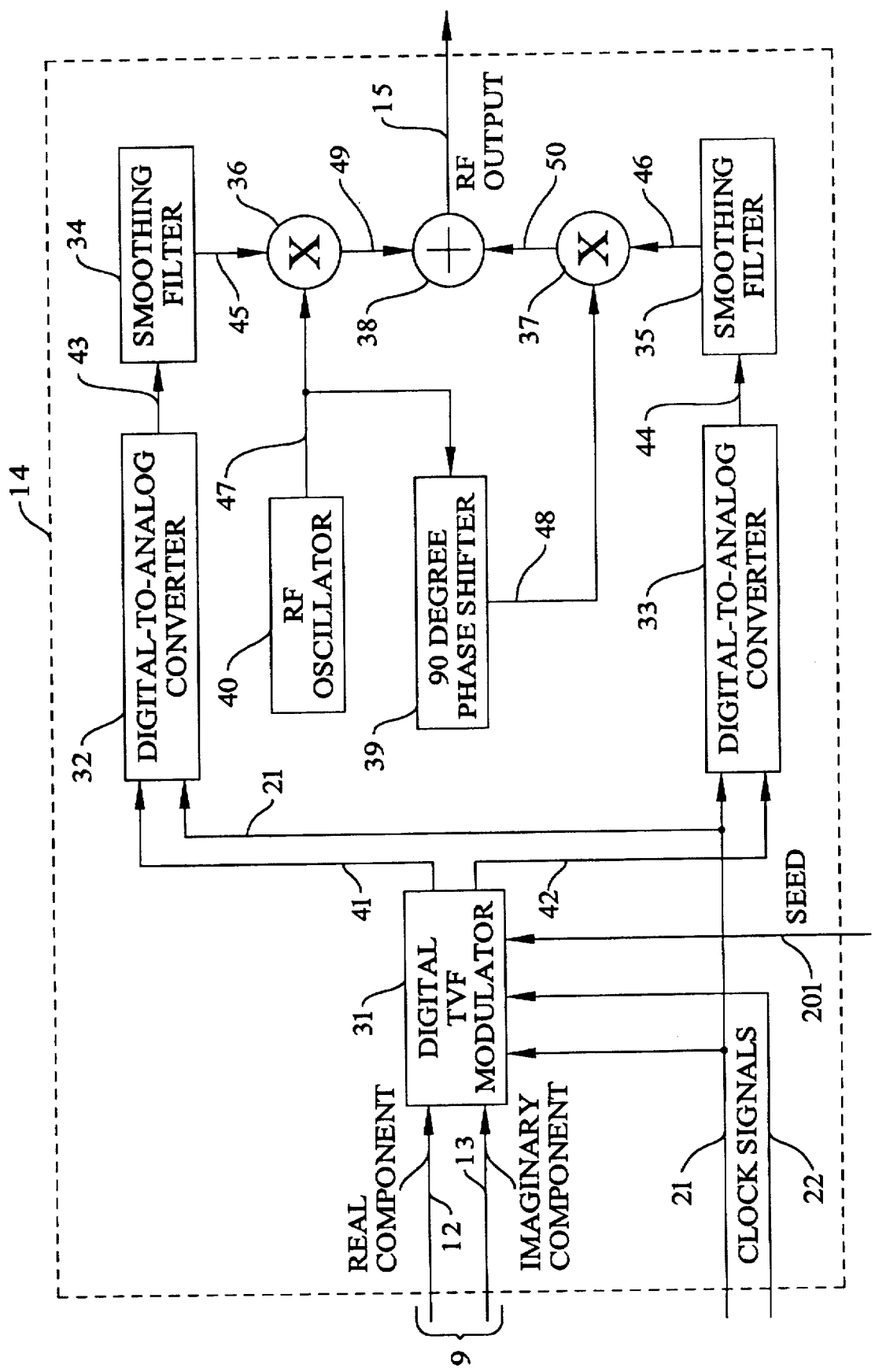
FIG. 3 is a block diagram of the TVF transmitting system of FIG. 1.

Referring to FIG. 3, input sequences 12 and 13, as well as clock signals 21 and 22, are provided as inputs to digital TVF modulator 31. Digital TVF modulator 31 provides a sequence of complex sample sequences comprised of real sequence 41 and imaginary sequence 42 at a fast (spread) rate which is faster than the rate at which the input sequences 12 and 13 are received by the digital TVF modulator 31. Sequence 41 represents a real value (in-phase component) and sequence 42 represents an imaginary value (quadrature component). Each of sequences 41 and 42 is sent to a digital-to-analog converters 32 and 33, respectively, to produce analog sequences 43 and 44, respectively. Analog sequences 43 and 44 are sent to smoothing filters 34 and 35, respectively, to produce continuous-time analog signals 45 and 46, respectively. An RF oscillator 40 generates a first sinusoidal carrier waveform signal 47 that is sent to a 90-degree phase shifter 39, which generates a second sinusoidal carrier waveform signal 48 whose phase differs from the phase of 47 by 90 degrees. Carrier waveform signals 47 and 48 are fed into multipliers 36 and 37, respectively, along with signals 45 and 46, respectively, to produce output signals 49 and 50, respectively. Signals 49 and 50 are added by summer 38 to produce the RF output signal 15.

Referring to FIG. 4, there is shown a digital TVF modulator 31 which performs a time-varying filter modulation on a slowly varying complex-valued message sequence 9 which is composed of real sequence 12 and imaginary sequence 13.

Digital TVF modulator 31 produces a rapidly varying spread sequence 58 which is composed of real sequence 41 and imaginary sequence 42. The following description is provided by way of example only. It is to be understood that the invention may include any number of shift registers comprised of any number of cells to suit the requirements of a particular application. Shift register 51 consists of three cells, cells 51a, 51b, and 51c. By way of example to illustrate the invention, shift register 52 consists of six cells, cells 52a through 52f. By way of example to illustrate the invention, shift register 54 consists of nine cells, cells 54a through 54i. By way of example to illustrate the invention, shift register 56 consists of six cells, cells 56a through 56f. Each of the cells of registers 51, 52, 54, and 56 is capable of holding a complex number. At the commencement of the initial input of input sequence 9 to digital TVF modulator 31, the values in cells 54g, 54h, and 54i are set to zero.

Clock signal 21, consisting of a sequence of pulses, is provided to shift registers 51, 52, 54, and 56 and to transformation stages 53 and 55, as well as to pseudorandom number generator 57. For clarity, not all connections of clock signal 21 are shown.

Referring to FIG. 4, input message sequence 9 is processed according to the following description. Elements of complex digital sequence 9 are shifted into shift register 51, which comprises registers 51a through 51c. By way of example, three samples $x_1$, $x_2$, and $X_3$ from 9 are shifted into shift register 51, with $x_1$ placed in cell 51c, $x_2$ placed in cell 51b, and $x_3$ placed in cell 51a. The numbering of the first sample from input message sequence 9 used in this example as $x_1$ is arbitrary; the sample labeled as $x_1$ need not be the first sample of the input sequence 9. Register 52 has a number L times as many cells as register 51; by way of example to illustrate the invention, the number L is 2, and register 52 has six cells, designated 52a through 52f. The contents of the cells of register 51 are copied into the cells of register 52, in such a way that the contents of each cell of register 51 are written into a number L of cells of register 52. In this example, cell 51a is copied into both cells 52a and 52b, cell 51b is copied into both cells 52c and 52d, and cell 51c is copied into both cells 52e and 52f.

Referring to FIG. 4, the pseudorandom number generator 57 creates two sets of pseudorandom complex-valued coefficients 211 and 212 and places coefficients 211 in transformation stage A 53 and coefficients 212 in transformation stage B 55. It is an important part of the invention that a new set of coefficients is created by pseudorandom number generator 57 which are loaded into 53 and 55 to perform a different mathematical transformation in transformation stage A 53 on each new set of samples in the cells of register 52, and a different mathematical transformation in transformation stage B 55 on each new set of samples in the cells of register 54. The pseudorandom number generator 57 is designed so that the coefficients 211 and 212 produced by pseudorandom number generator 57 are the result of a deterministic mathematical function of exactly two numbers: 1) a fixed seed 201 which in normal operation is provided by the operator to both spread spectrum transmitting system 10 and spread spectrum receiving system 11 before the start of operation, and 2) the clock signal 22 which provides a precise numerical indication of the time. The contents of shift register 52 are provided to transformation stage A 53 and the result is placed in cells 54a through 54f of shift register 54. The inputs to transformation stage B 55 consist of the contents of cells 54d through 54f, which come directly from transformation stage A 53, and the contents of cells 54g through 54i, which are carried over from prior processing of input message sequence 9. Cells 54d through 54i of shift register 54 are provided to transformation stage B 55, and the result is placed in cells 56a through 56f of shift register 56. Shift register 54 is shifted six units to the right, so that the contents of the six rightmost cells 54d through 54i are discarded, and the contents $v_6$ through $v_4$ of cells 54a through 54c are placed in cells 54g through 54i, respectively. The output sequence consisting of real component 41 and imaginary component 42 is provided by shift register 56.

Figure 5:
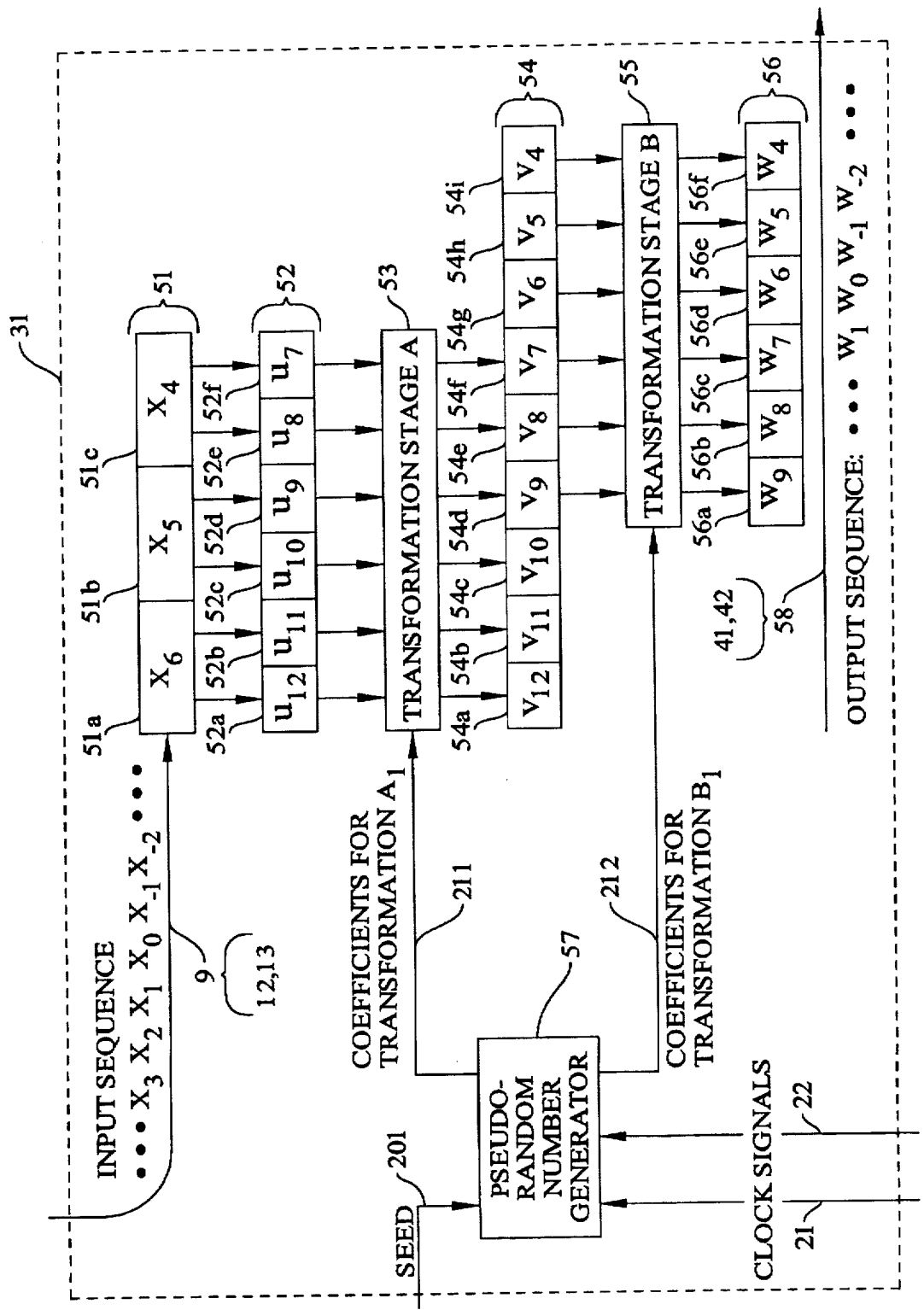

Referring now to FIG. 5, there is shown an example of the operation of digital TVF modulator 31 after one shift has occurred from the status of digital TVF modulator 31 shown in FIG. 4. A comparison between FIGS. 4 and 5 shows how the numbers have been shifted and altered by the various shifts and transformations.

Referring to FIG. 7, there is shown a digital TVF demodulator 67 which performs a time-varying filter demodulation on a complex-valued input sequence of digital samples 76 which is composed of real sequence 70 and imaginary sequence 71. The output of 67 is a despread sequence of complex-valued digital samples 166 which is composed of real sequence 164 and imaginary sequence 165.

By way of example to illustrate the invention, shift register 151 consists of six cells, cells 151a through 151f. By way of example to illustrate the invention, shift register 153 consists of nine cells, cells 153a through 153i. By way of example to illustrate the invention, shift register 155 consists of six cells, cells 155a through 155f. By way of example to illustrate the invention, shift register 159 consists of three cells, cells 159a through 159c.

Clock signal 72, consisting of a sequence of pulses, is provided to shift registers 151, 153, 155, and 159 and to transformation stages 152 and 154, as well as to pseudorandom number generator 160. For clarity, not all connections of clock signals 72 are shown.

The operation of digital TVF demodulator 67 processes signal 76 in accordance with the following steps. At the commencement of the initial input of input sequence 76 to the digital TVF demodulator 67, values in cells 153g, 153h, and 153i are set to zero.

Elements of complex digital sequence 76 are shifted into shift register 151, which comprises cells 151a through 151f. By way of example, six samples from 76 are shifted into 151. The pseudorandom number generator 160 creates two sets of pseudorandom complex-valued coefficients, 214 and 213, resp., which prescribe the mathematical inverse of each transformation in transformation stage A 53 and the mathematical inverse of each transformation in transformation stage B 55, respectively; and 160 places such sets of coefficients 214 and 213 into inverse transformation stage A 154 and inverse transformation stage B 152, resp., in time correspondence such that the application of each inverse transformation in 154 and 152 reverses the effect of the corresponding transformation in 53 and 55, respectively.

The coefficients 213 and 214 produced by the pseudorandom number generator 160 are the result of a deterministic mathematical function of exactly two numbers: 1) a fixed seed 201 which in normal operation is provided by the operator to both spread spectrum transmitting system 10 and spread spectrum receiving system 11 before the start of operation, and 2) the clock signal 73 representing a precise numerical indication of the time. The contents of shift register 151 are provided to inverse transformation stage B 152 and the result is placed in cells 153a through 153f of shift register 153. The inputs to inverse transformation stage A 154 consist of the contents of cells 153d through 153f, which come directly from inverse transformation stage B 152, and the contents of cells 153g through 153i, which are carried over from prior processing of input sequence 76. Cells 153d through 153i of shift register 153 are provided to inverse transformation stage A 154, and the result is placed in cells 155a through 155f of shift register 155. The values in cells 155a and 155b of shift register 155 are averaged by averager 156, and the result is placed into register 159a of shift register 159. The values in cells 155c and 155d of shift register 155 are averaged by averager 157, and the result is placed into register 159b of shift register 159. The values in cells 155e and 155f of shift register 155 are averaged by averager 158, and the result is placed into register 159b of shift register 159. Shift register 153 is shifted six units to the right, so that the contents of the six rightmost cells 153d through 153i are discarded, and the contents of cells 153a through 153c are placed in cells 153g through 153i, respectively. The output sequence 78 is provided by shift register 159.

Figure 8:
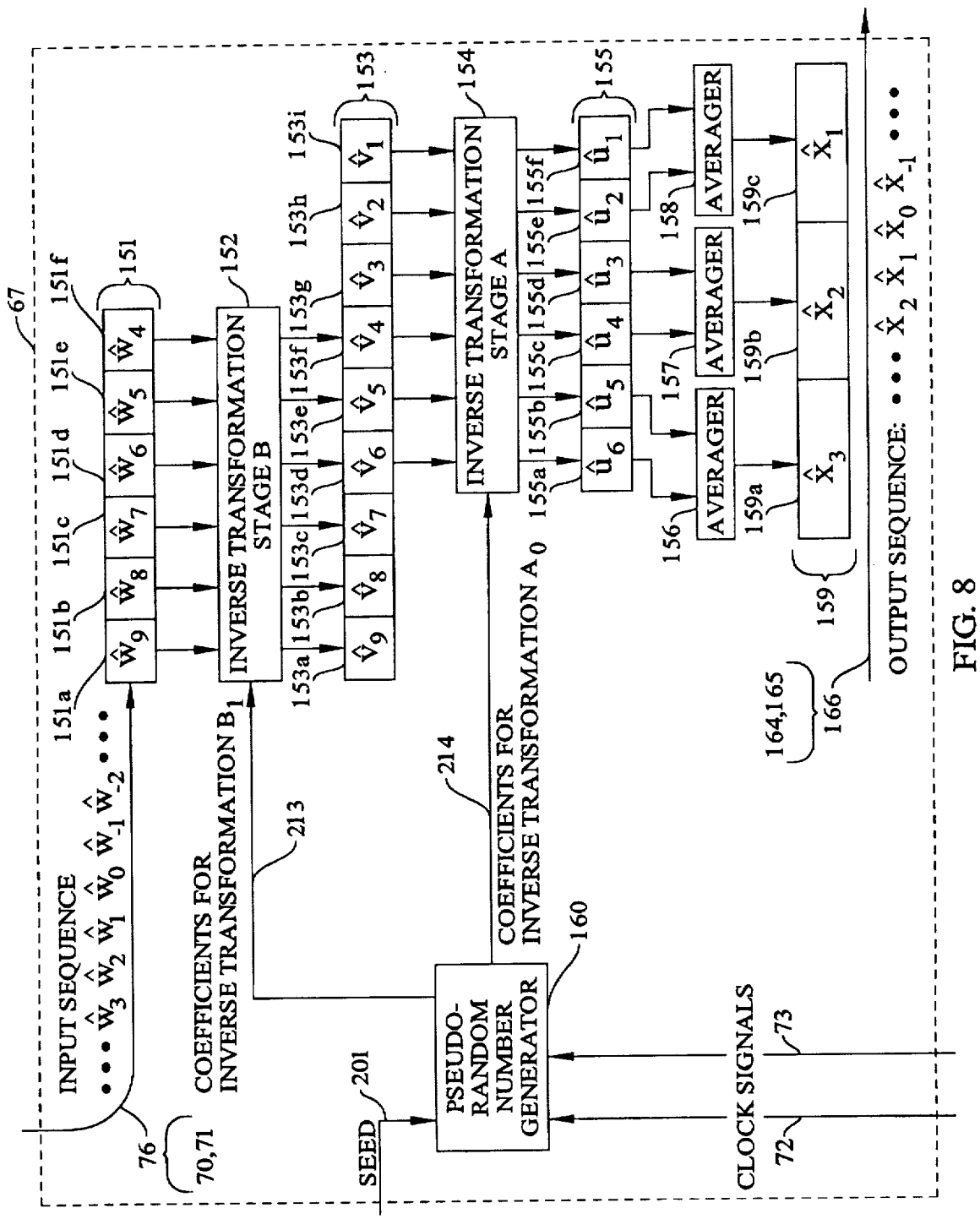

Referring now to FIG. 8, there is shown an example of the operation of digital TVF demodulator 67 after one shift has occured from the status of digital TVF modulator 67 shown in FIG. 7. A comparison between FIGS. 7 and 8 shows how the numbers have been shifted and altered by the various shifts and transformations.

Figure 6:
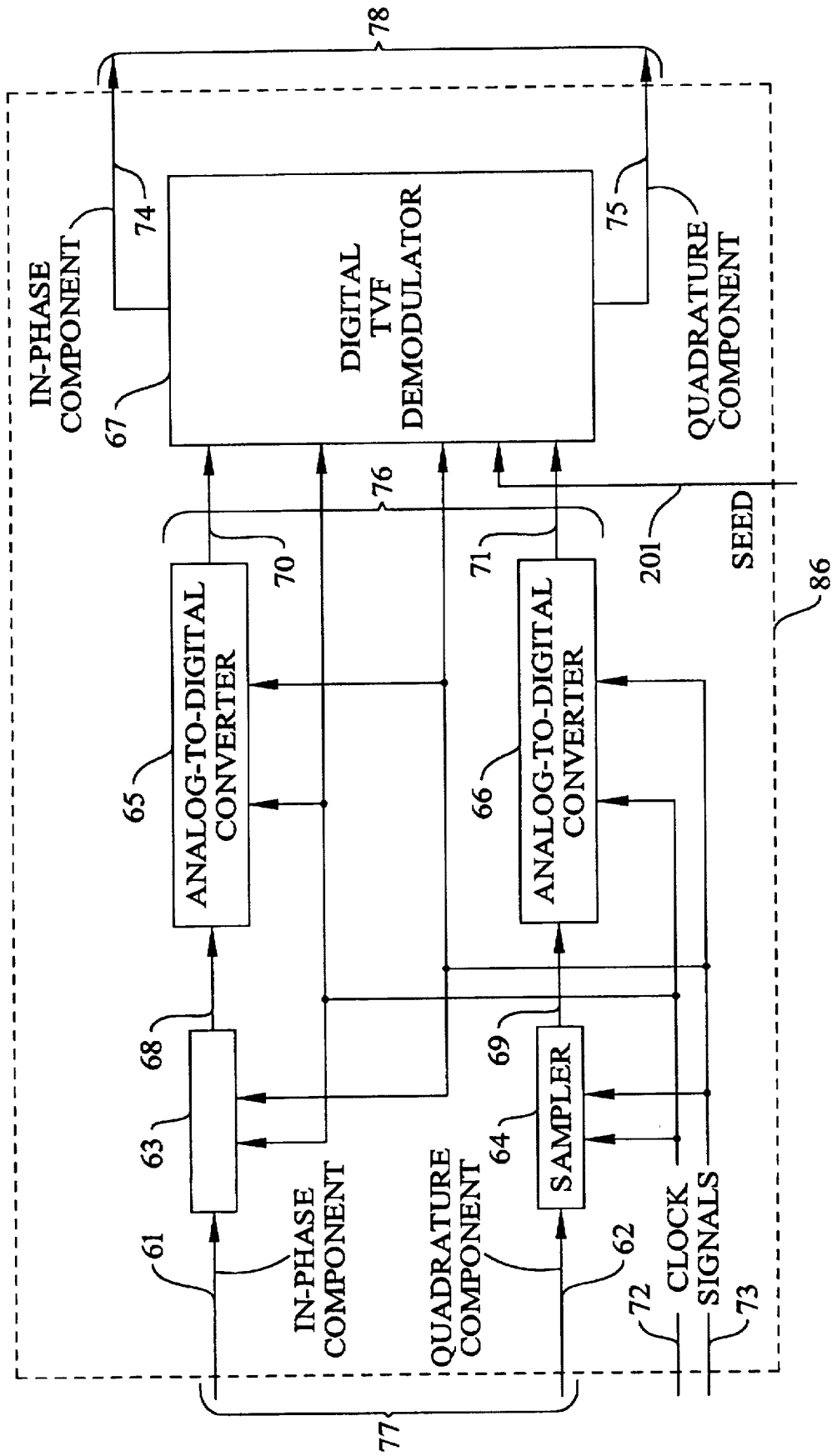
FIG. 6 is a block diagram of the A-D demodulator of FIG. 9.

Referring to FIG. 6, there is shown an A-D demodulator 86 that provides analog-to-digital conversion and TVF demodulation functions. The A-D demodulator 86 samples the two analog input signals, in-phase component 61 and quadrature component 62 of 77, using samplers 63 and 64, respectively, to produce discrete-time analog signals 68 and 69. Then 86 uses analog-to-digital converters 65 and 66, respectively, under control of clock signals 72 and 73, to generate discrete-time digital signals 70 and 71, respectively. Signals 70 and 71 are fed into a digital TVF demodulator 67, which performs the time-varying filter spread spectrum demodulation, and provides real component 74 and complex component 75 of complex digital samples 78 as output.

Figure 9:
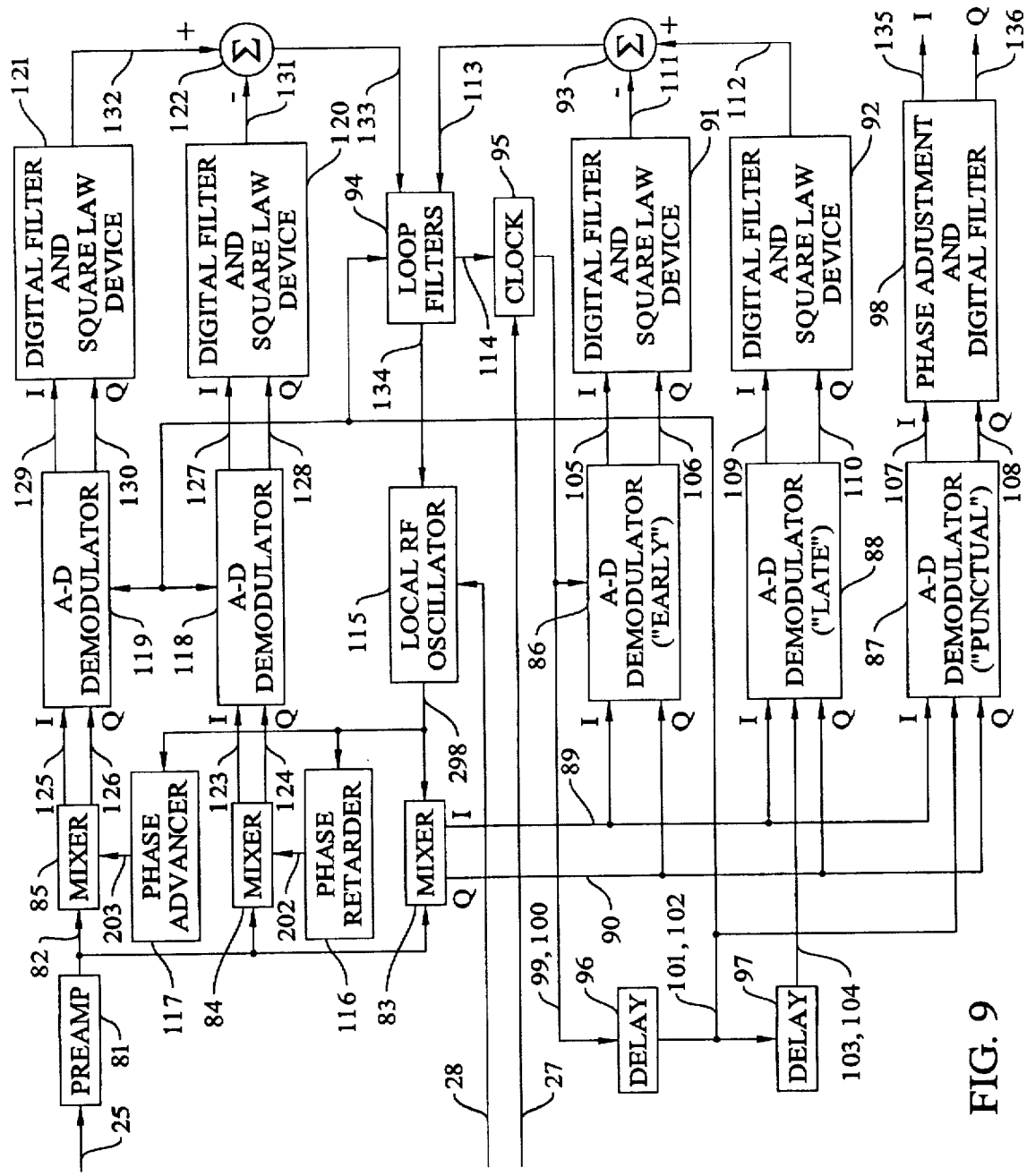
FIG. 9 is a block diagram of the TVF Receiving System of FIG. 2.

Referring to FIG. 9, TVF receiving system 24 is almost an entire receiver for time-varying filter spread spectrum. However, the TVF receiving system 24 does not provide the function of acquisition of synchronization, which is accomplished by direct sequence spread spectrum receiving system 26. One of the important functions of TVF receiving system 24 is tracking of synchronization. The phrase "tracking of synchronization" means that once TVF receiving system 24 is locked in synchronism with the timing and frequency of the incoming signal 25, TVF receiving system 24 should maintain synchronism.

Still referring to FIG. 9, an RF signal 25 provided by receiving antenna 23 of FIG. 2 is amplified by preamp 81, a preamplifier. The RF signal 82 provided by preamp 81 is fed to mixers 83, 84, and 85, each of which produces "in-phase" and "quadrature" outputs. In FIG. 9, the abbreviation "i" is used for "in-phase" and the abbreviation "Q" is used for "quadrature". The "in-phase" and "quadrature" outputs of mixer 83 are 89 and 90, resp.; the "in-phase" and "quadrature" outputs of mixer 84 are 123 and 124, resp.; and the "in-phase" and "quadrature" outputs of mixer 84 are 125 and 126, resp.

The outputs 89 and 90 of mixer 83 are fed to an early-late gate loop, which we designate loop L1, the purpose of which is to track code timing of the incoming RF signal 25. Early-late gate loop L1 includes A-D demodulators 86, 87, and 88; digital filter and square law device units 91 and 92; summer 93; loop filters unit 94; clock 95; and delay units 96 and 97. Early-late gate loop L1 is conventional except for A-D demodulators 86, 87, and 88. A-D demodulators 87 and 88 are exact replicas of A-D demodulator 86 depicted in FIG. 6. Signal components 89 and 90 are fed into three A-D demodulators 86, 87, and 88, whose timings are referenced as "Early", "Punctual", and "Late", respectively. Such timings are produced by delaying the output signals 99 and 100 of clock 95 using delay units 96 and 97 which produce a small delay. The small delay period is selected as a matter of design choice using known techniques for designing early-late gate loops. Clock 95 produces a sequence of pulses 99, and a time signal 100.

The in-phase and quadrature output signals 105 and 106, respectively of A-D demodulator 86 are provided to digital filter and square law device 91, which produces discrete-time sample sequence 111, representing a measure of the power output of A-D demodulator 86. The in-phase and quadrature outputs 109 and 110, respectively, of A-D demodulator 88 are sent to digital filter and square law device 92, which produces discrete-time sample sequence 112, representing the power output of A-D demodulator 88. It is to be noted that the power output of each of A-D demodulators 86, 87, and 88 correlates with how closely the timing of that A-D demodulator is matched to the code timing of the incoming signal 25. Summer 93 generates a sample sequence 113, representing the difference of between signals 112 and 111. Sample sequence 113 then is provided as an input to loop filters 94. The output of loop filters 94 that is relevant to tracking of timing synchronization is 114. Signal 114 controls clock 95, causing 95 to speed up or slow down to correct mismatches in the timing of A-D demodulators 86, 88 relative to incoming signal 25.

Frequency tracking of local RF oscillator 115 relative to the incoming signal 25 is accomplished by means of a loop, which we designate L2, comprising the following components: local RF oscillator 115; mixers 84 and 85; phase retarder 116; phase advancer 117; A-D demodulators 118 and 119; digital filter and square law device units 120 and 121; summer 122; and loop filters 94. A-D demodulators 118 and 119 are exact replicas of A-D demodulator 86 depicted in FIG. 6.

The output signal 298 of local RF oscillator 115 is provided to phase retarder 116, which produces a phase retarded signal 202, and phase advancer 117, which produces a phase advanced signal 203. Signal 202 is mixed with 82 in mixer 84 to produce in-phase 123 and quadrature 124 outputs. Signal 203 is mixed with 82 in mixer 85 to produce in-phase 125 and quadrature 126 outputs. Signals 123 and 124 are fed into A-D demodulator 118, the output of which are digital sample sequences 127 and 128 as in-phase and quadrature components, resp. Signals 125 and 126 are fed into A-D demodulator 119, the output of which are digital sample sequences 129 and 130 as in-phase and quadrature components, resp. Sample sequences 127 and 128 are fed into digital filter and square law device 120, the output of which, 131, is fed subtractively into summer 122. Sample sequences 129 and 130 are fed into digital filter and square law device 121, the output of which, 132, is fed additively into summer 122. The output of summer 122 is fed into loop filters 94. The output 134 of loop filters 94 controls the frequency of local oscillator 115.

The demodulated output 135 and 136 of TVF receiving system 24 is produced by A-D demodulator 87, the "punctual" A-D demodulator, in conjunction with phase adjustment and digital filter 98. The outputs of 87 are in-phase sample sequence 107 and quadrature sample sequence 108. Sequences 107 and 108 are provided as inputs to phase adjustment and digital filter unit 98. Phase adjustment and digital filter unit 98 removes a possible arbitrary phase component, which may be constant or monotonically varying, from the complex sequence 204 consisting of incoming sequence 107 as real part and incoming sequence 108 as imaginary part. Removal of an arbitrary phase component is accomplished using known properties of the message signal 9, as for example, whether the signal 9 is real or binary, or whether 9 consists of samples from a predetermined constellation set of complex values, each value having an amplitude and phase. Following the phase adjustment, the digital filter operation of 98 may be used to compensate for inaccuracies in 14 and 24, such as inaccuracies in spectral power distribution. The output of TVF receiving system 24 includes an in-phase component sequence 135 and a quadrature component sequence 136.

Figure 11:
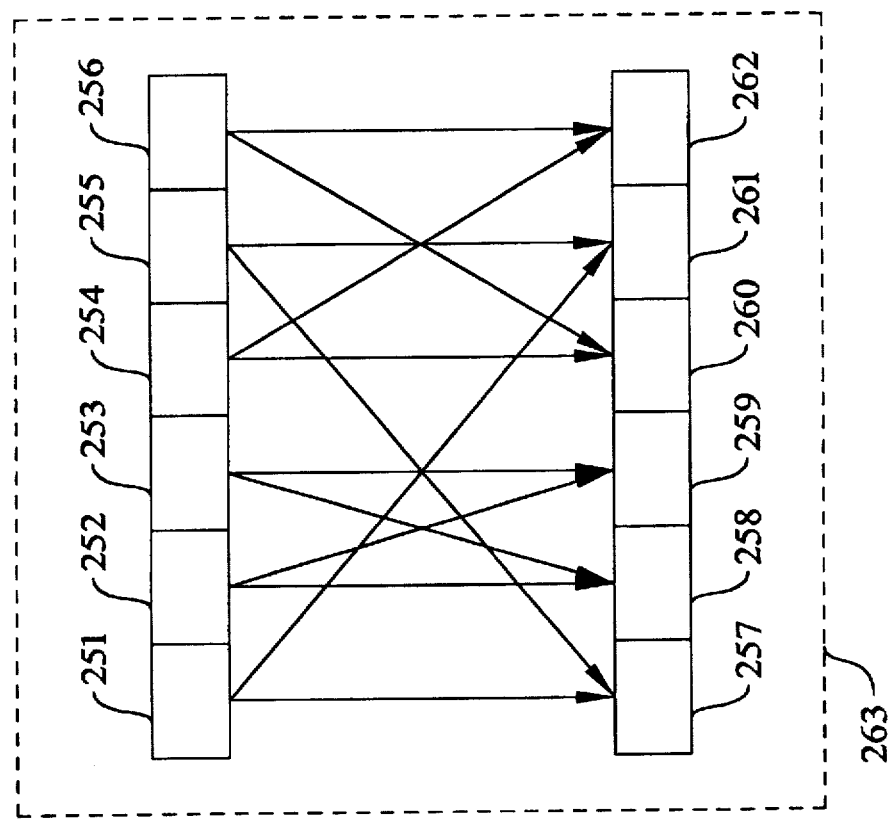
FIG. 11 illustrates an example of a transformation unit A or B composed of unitary transformations.

Referring to FIG. 11, there is shown a transformation stage 263, which may be used for 53 and 55 in FIG. 4 and FIG. 5, and 152 and 154 in FIG. 7 and FIG. 8. By way of example to illustrate a transformation stage, transformation stage 263 maps six input cells to six output cells. The input cells to transformation 263 are 251 through 256; the output cells of transformation 263 are 257 through 262. Transformation stage 263 is composed of the following three independent unitary transformations of the form 240 shown in FIG. 12, which (as a significant part of the invention) may be performed in parallel to effect a savings of the time needed for computation: the unitary transformation consisting of input cells 251 and 255 and output cells 257 and 261 and the four links which map from input cells 251 and 255 to output cells 257 and 261; the unitary transformation consisting of input cells 252 and 253 and output cells 258 and 259 and the four links which map from input cells 252 and 253 to output cells 258 and 259; and the unitary transformation consisting of input cells 254 and 256 and output cells 260 and 262 and the four links which map from input cells 254 and 256 to output cells 260 and 262.

Figure 12:
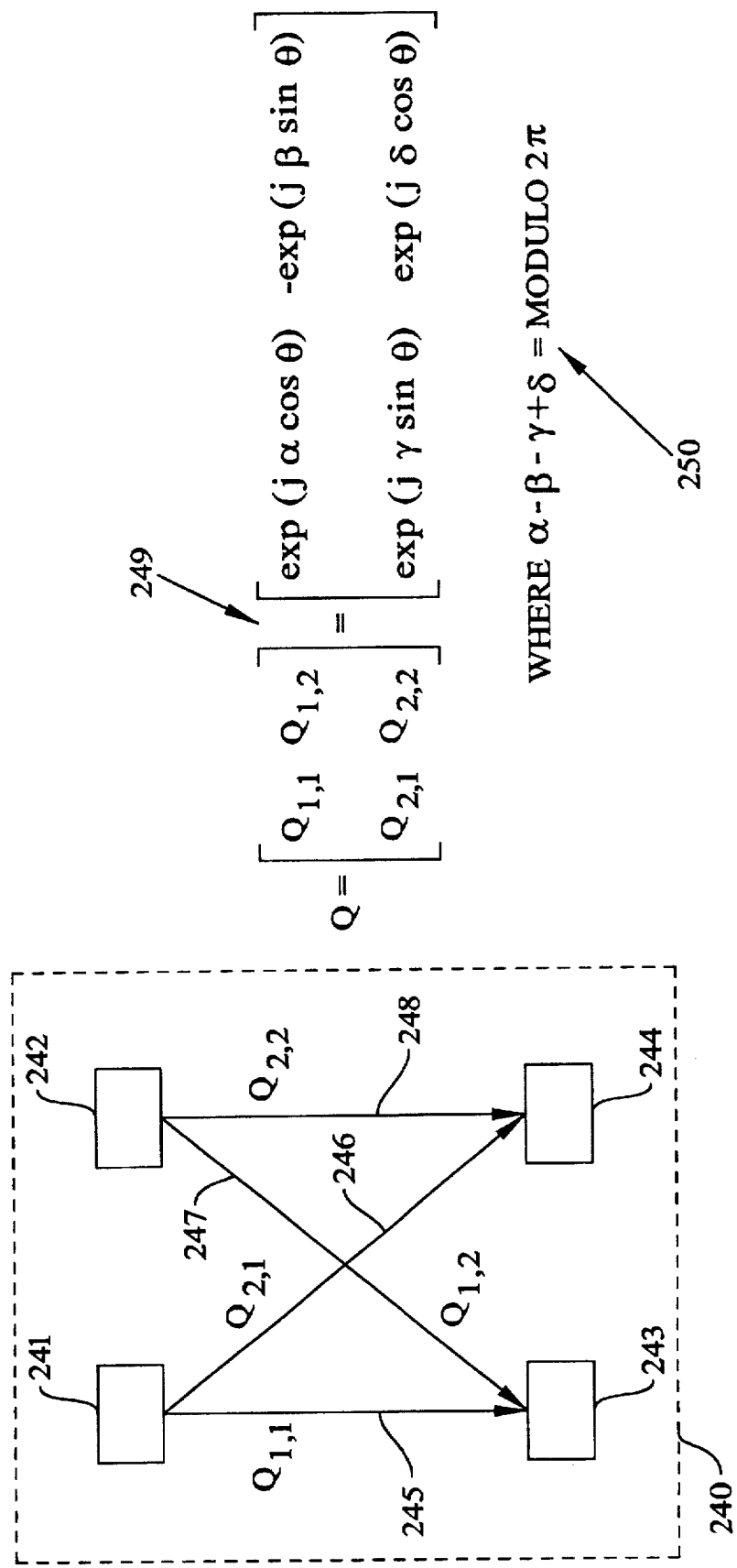
FIG. 12 illustrates a general 2×2 unitary transformation where each arrow represents multiplication by a complex coefficient.

Referring to FIG. 12, there is shown a 2×2 ("two by two") unitary transformation unit 240. The unit 240 is composed of four cells numbered 241, 242, 243, and 244, and four links, numbered 245, 246, 247, and 248, where each link represents a complex multiplication. The complex numbers which are inputs to the transformation unit 240 are placed in cells 241 and 242. The complex numbers which are output results of the transformation unit 240 are placed in cells 243 and 244 by the calculations to be described. The complex result placed in cell 243 is formed as the sum of two products: the product of complex input value 241 with the complex multiplication factor $Q_{1,1}$ designated on link 245, and the product of complex input value 242 with the complex multiplication factor $Q_{1,2}$ designated on link 247. The complex result placed in cell 244 is formed as the sum of two products: the product of complex input value 241 with the complex multiplication factor $Q_{2,1}$ designated on link 246, and the product of complex input value 242 with the complex multiplication factor $Q_{2,2}$ designated on link 248. The values of the complex multiplicative factors designated on the links 245 through 248 are calculated by the transformation unit 240 on the basis of formulas 249 and 250 of FIG. 12, from pseudorandom real values for variables $\alpha$, $\beta$, $\gamma$, and $\theta$ provided by pseudorandom number generator 57 or 160. The variable 6 is calculated by means of formula 250 and substituted into formula 249.

Figure 13:
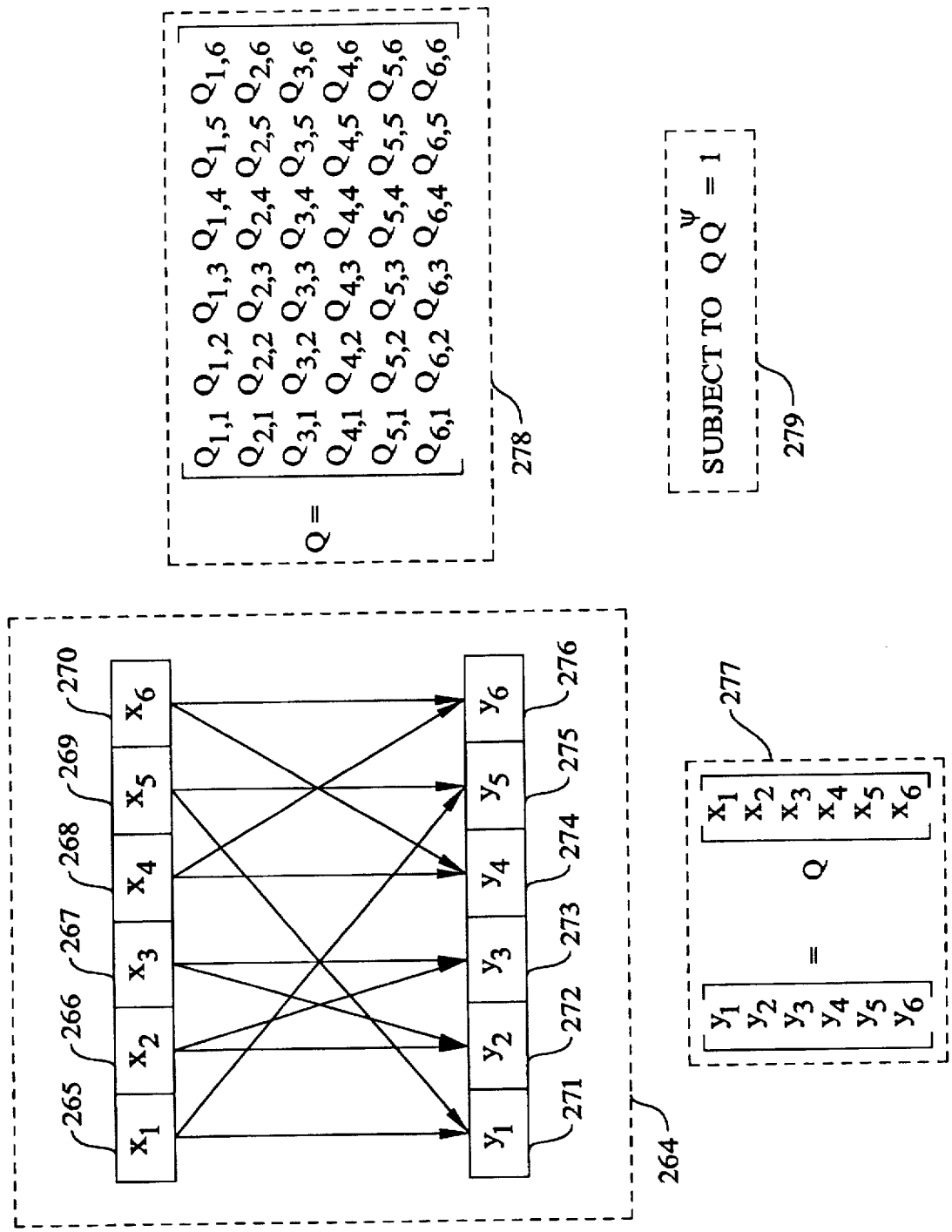
FIG. 13 illustrates a general 6×6 unitary transformation in the form of a matrix.

Referring to FIG. 13, there is shown a transformation stage 264, which may be used for 53 and 55 in FIG. 4 and FIG. 5, and 152 and 154 in FIG. 7 and FIG. 8. Transformation stage 264 is composed of a unitary 6×6 (six by six) matrix. Output cells $y_1$ through $y_6$ are determined from input cells $x_1$ through $x_6$, resp., by means of equation 277 utilizing matrix Q 278, which matrix Q 278 is subject to the mathematical unitary condition 279, where the symbol "t" means "complex conjugate transpose".

The number L, which is the ratio of the sample rate of sequence 58 to the sample rate of sequence 9, is a measure of the extent of frequency spreading accomplished by digital TVF modulator 31, where L is a positive integer. For purposes of illustration, the TVF transmitting system 14 and TVF receiving system 24 have been described with a value L equal to 2. Values of L in the range 50 to 1000 would be most useful.

An alternate method of designing a time varying filter spread spectrum system is by interspersing a number L-1 of zeros between each pair of samples of the message sequence, and using the resulting sequence as the input to a transversal filter F1 of conventional design whose filter tap coefficients would be time-varying under the control of a pseudorandom number generator R1. The transversal filter F1 and pseudorandom number generator R1 would be substituted for digital TVF modulator 31 in TVF transmitting system 14. In TVF receiving system 24, a filter F2 would be substituted for digital TVF demodulator 67 which is designed to be a matched filter to F1 at each instant that F2 processes a signal produced by F1.

A second alternate method of implementing a time varying filter spread spectrum system is by interspersing a number L-1 of zeros between each pair of samples of the message sequence, and using the result as the input to a transversal filter F1 of conventional design whose filter tap coefficients are fixed. The transversal filter F1 would be substituted for digital TVF modulator 31 in TVF transmitting system 14. In TVF receiving system 24, a conventional fixed filter F2, matched to F1, would be substituted for digital TVF demodulator 67.

Although the invention has been described with reference to specific embodiments, numerous variations and modifications of the invention may become readily apparent to those skilled in the art in light of the above teachings. An alternate form of time-varying filter for spread spectrum modulation may be implemented using a transversal filter with time-varying coefficients. Demodulation may be effected by means of a matched filter form of transversal filter with time-varying coefficients. Therefore, it is to be understood that the invention may be practiced other than as specifically described.

I claim:

1. A method for transmitting information by radio over a wide bandwidth, comprising the steps of:

1) inputting a data signal into a time varying filter modulator;

2) spreading the data signal in time and in frequency to produce a wideband signal;

3) modulating the wideband signal onto an RF carrier to provide an RF output signal; and 4) transmitting the RF output signal.

2. The method of claim 1 wherein step (2) includes performing a series of linear transformations on the data signal.

* * * * *